United States Patent
Jang et al.

(10) Patent No.: US 9,984,010 B2
(45) Date of Patent: May 29, 2018

(54) METHOD AND APPARATUS FOR COPYING DATA USING CACHE

(71) Applicant: Samsung Electronics Co., Ltd., Suwon-si, Gyeonggi-do (KR)

(72) Inventors: Jin Yong Jang, Hwaseong-si (KR); Gil Yoon Kim, Yongin-si (KR); Jin Young Park, Hwaseong-si (KR); Seung Jin Yang, Seoul (KR); Chun Mok Chung, Anyang-si (KR); Jin Choi, Suwon-si (KR); Eun Seok Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 14/275,063

(22) Filed: May 12, 2014

(65) Prior Publication Data

US 2015/0089160 A1     Mar. 26, 2015

(30) Foreign Application Priority Data

Sep. 26, 2013   (KR) .................. 10-2013-0114658

(51) Int. Cl.
| | |
|---|---|
| *G06F 12/00* | (2006.01) |
| *G06F 13/16* | (2006.01) |
| *G06F 12/084* | (2016.01) |
| *G06F 12/0802* | (2016.01) |

(52) U.S. Cl.
CPC .......... *G06F 13/16* (2013.01); *G06F 12/0802* (2013.01); *G06F 12/084* (2013.01); *G06F 13/1652* (2013.01); *G06F 13/1663* (2013.01); *G06F 2212/306* (2013.01)

(58) Field of Classification Search
CPC .. G06F 13/16; G06F 13/1652; G06F 13/1663; G06F 12/0802; G06F 12/084; G06F 2212/306
See application file for complete search history.

(56) References Cited

U.S. PATENT DOCUMENTS

| | | | |
|---|---|---|---|
| 6,658,533 B1 | 12/2003 | Bogin et al. | |
| 6,708,257 B2 * | 3/2004 | Bao ................... | G06F 13/1673 710/112 |
| 7,310,712 B1 | 12/2007 | Gordon | |
| 7,464,243 B2 | 12/2008 | Haridas et al. | |
| 2003/0200408 A1 * | 10/2003 | Mekhiel ............. | G06F 12/0215 711/167 |
| 2006/0136682 A1 | 6/2006 | Haridas et al. | |
| 2008/0250211 A1 * | 10/2008 | Imamizu ............. | G06F 12/0862 711/154 |
| 2009/0089515 A1 | 4/2009 | Michalak et al. | |
| 2009/0198897 A1 * | 8/2009 | Arimilli ............. | G06F 9/30032 711/122 |

(Continued)

FOREIGN PATENT DOCUMENTS

KR    10-2005-0077519 A      8/2005

*Primary Examiner* — Shawn X Gu
(74) *Attorney, Agent, or Firm* — Jefferson IP Law, LLP (57) ABSTRACT

A cache and a method for performing data copying are provided. The cache includes a copy logic and be connected to a processor through a first bus and to a memory controller through a second bus, which is different from the first bus. Moreover, the copy logic may perform data copying through the second bus based on a data copy command received from the processor.

20 Claims, 10 Drawing Sheets

(56) References Cited

U.S. PATENT DOCUMENTS

2011/0173393 A1* 7/2011 Isono ................. G06F 12/0844
  711/122
2015/0067271 A1* 3/2015 Camp ................. G06F 12/0804
  711/143

* cited by examiner

METHOD AND APPARATUS FOR COPYING DATA USING CACHE

CROSS-REFERENCE TO RELATED APPLICATION(S)

This application claims the benefit under 35 U.S.C. § 119(a) of a Korean patent application filed on Sep. 26, 2013 in the Korean Intellectual Property Office and assigned Serial No. 10-2013-0114658, the entire disclosure of which is hereby incorporated by reference.

TECHNICAL FIELD

The present disclosure relates to a method and apparatus for copying data on a memory using cache.

BACKGROUND

In a general computing device, the term "copying" means that a processor such as a Central Processing Unit (CPU) reads data from certain memory blocks and writes the data to other memory blocks. General memory copying (or data copying) techniques generally include Programmed Input Output (PIO) and Direct Memory Access (DMA) techniques.

Figure 1A:
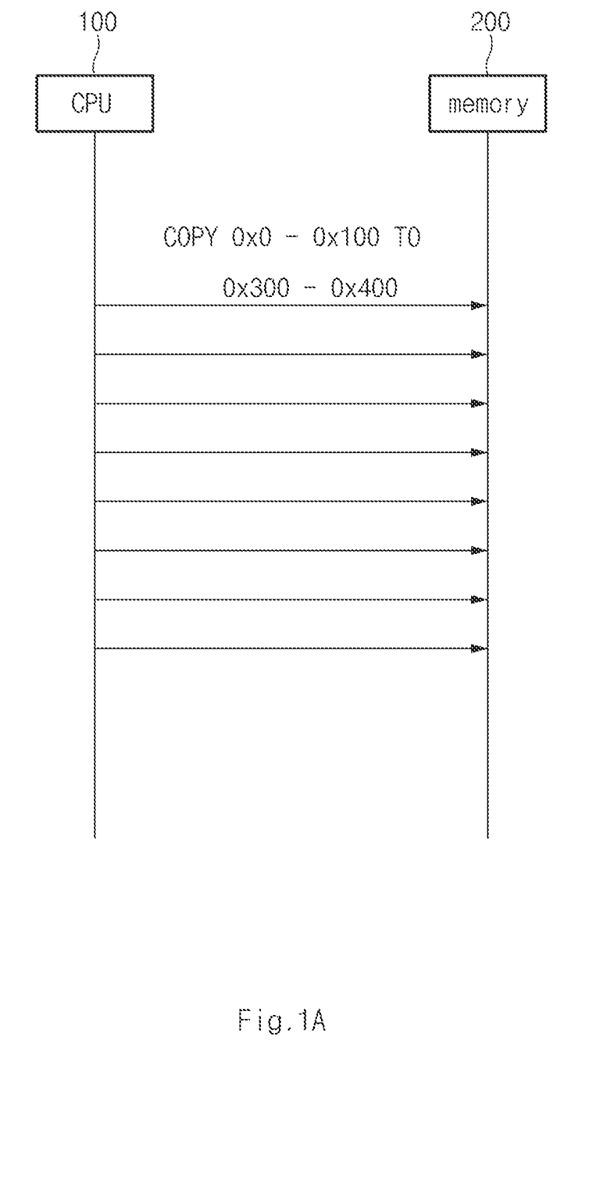
FIG. 1A is a conceptual view of copying data by using a Programmed Input Output (PIO) technique according to the related art.

FIG. 1A is a conceptual view of copying data by using the PIO technique according to the related art.

Referring to FIG. 1A, in the case of the PIO technique, a CPU 100 directly repeats load/store data commands until the operation of copying data to be copied is completed. For example, in order to copy data corresponding to memory addresses 0x0 to 0x100 into memory addresses 0x300 to 0x400 of a memory 200, the CPU 100 is generally required to continue to transmit copy commands.

Figure 1B:
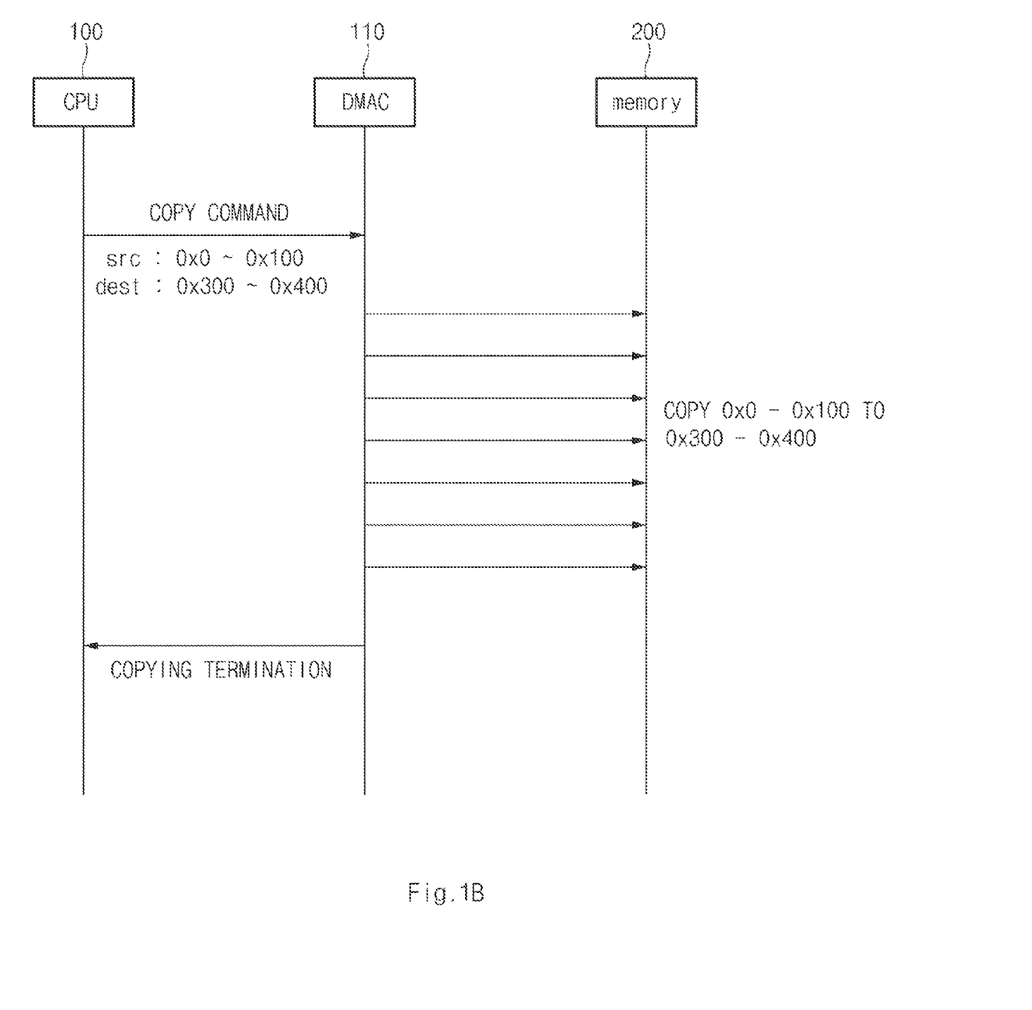
FIG. 1B is a conceptual view of copying data by using a Direct Memory Access (DMA) technique according to the related art.

FIG. 1B is a conceptual view of copying data by using the DMA technique according to the related art.

Referring to FIG. 1B, in contrast to the PIO technique, the DMA technique further uses a DMA Controller (DMAC) 110. When data needs to be copied from the memory addresses 0x0 to 0x100 into the memory addresses 0x300 to 0x400 as mentioned in the example above, in the case of the DMA technique, the CPU 100 transmits to the DMAC 110 a command copying source data on memory address 0x0 to 0x100 into destinations, memory addresses 0x300 to 0x400. The DMAC 110 performs data copying on a memory 200. If copying is completed, the DMAC 110 generates an interrupt and notifies the CPU 100 that copying is completed.

Figure 1C:
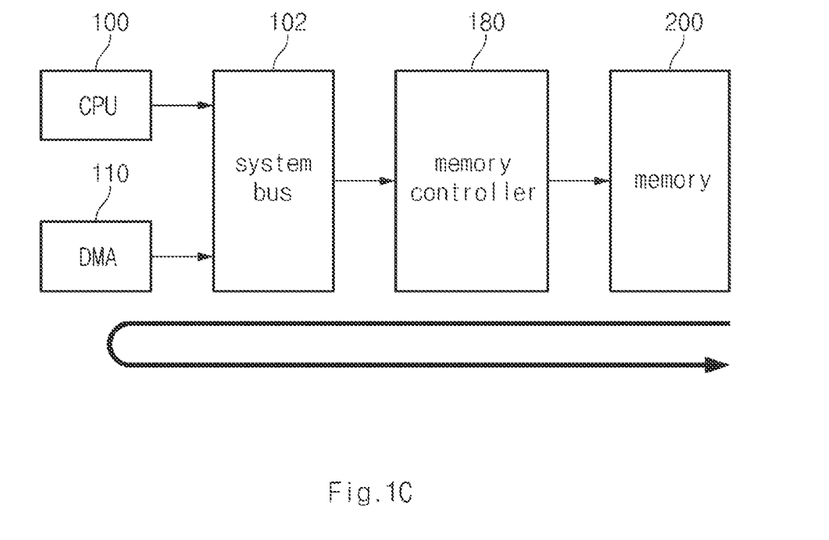
FIG. 1C is a conceptual view of a data flow in copying data according to a PIO or a DMA technique according to the related art.

FIG. 1C is a conceptual view of a data flow in copying data according to the PIO or DMA technique according to the related art.

Referring to FIG. 1C, the CPU 100 or the DMAC 110 provides a copy data command to a memory controller 180. The command is transmitted through a system bus 102. The memory controller 180 reads data to be copied from the memory 200. The read data is transmitted back to the CPU 100 (e.g., by using the PIO technique) or the DMA controller 110 (e.g., by using the DMA technique) through the system bus 102 and then is written to a target memory block of the memory by the memory controller 180.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

In the case of the Programmed Input Output (PIO) technique generally, all data/commands pass through the Central Processing Unit (CPU), so heavy load occurs on the CPU and a system becomes slow. Moreover, in the case of the Direct Memory Access (DMA) technique, the CPU has no load because the CPU 100 only needs to command data copying and check last interrupt, but the CPU unnecessarily occupies the bandwidth of the system bus in the similar way as the PIO technique. For example, both the PIO technique and the DMA technique occupy the bandwidth of the system bus when copying data and may thus decrease system performance.

In order to improve some of the above-identified drawbacks of the related art, an aspect of the present disclosure is provided to decrease bus traffic occurring when copying data by using cache and enhance system performance.

Another aspect of the present disclosure is provided to enhance the operation performance of a memory controller through buffering data to be copied by using a buffer in a cache.

Another aspect of the present disclosure is not limited thereto but includes matters that are mentioned through the detailed description or the claims or may be grasped obviously therefrom.

In accordance with an aspect of the present disclosure, a cache for performing data copying is provided. The cache includes a copy logic, and the cache is connected to a processor through a first bus and to a memory controller through a second bus, which is different from the first bus. The copy logic performs data copying through the second bus based on a data copy command received from the processor.

In accordance with another aspect of the present disclosure, the cache may be a stand-alone device in relation to the processor and the memory controller.

In accordance with another aspect of the present disclosure, the first bus may be a system bus, and the second bus may be a local bus.

In accordance with another aspect of the present disclosure, the data copy command may include a control signal, information on source data to be copied, and information on a destination to which the source data is copied.

In accordance with another aspect of the present disclosure, the information on source data to be copied may include start and last addresses of the source data on a memory, or a start address of the source data on the memory and a length of the source data.

In accordance with another aspect of the present disclosure, if the performing of the data copying is completed, the cache may notify the processor of completion of the data copying through the first bus.

In accordance with another aspect of the present disclosure, the cache may further include a buffer. The copy logic may allow the memory controller to read data from the memory and to store the data to the buffer, and write data stored in the buffer to a predetermined memory block on the memory.

In accordance with another aspect of the present disclosure, a method of performing data copying is provided. The method includes receiving, at a cache, a data copy command from a processor through a first bus, and performing, at the cache, data copying based on the received copy data command through a second bus, which is different from the first bus.

In accordance with another aspect of the present disclosure, the cache may be a stand-alone device in relation to a device connected to the cache by the first bus or the second bus.

In accordance with another aspect of the present disclosure, the first bus may be a system bus, and the second bus may be a local bus.

In accordance with another aspect of the present disclosure, the first bus may be a first local bus, and the second bus may be a second local bus.

In accordance with another aspect of the present disclosure, the data copy command may include a control signal, information on source data to be copied, and information on a destination to which the source data is copied.

In accordance with another aspect of the present disclosure, the cache may be connected to the memory controller through the second bus, and the performing, at the cache, of the data copying may include, at a cache side, allowing the memory controller to write data corresponding to the information on source data to a memory block corresponding to the information on a destination In accordance with another aspect of the present disclosure, the information on source data to be copied may include start and last addresses of the source data on a memory, or a start address of the source data on the memory and a length of the source data.

In accordance with another aspect of the present disclosure, the cache may further include a buffer, and the performing, at the cache, of the data copying may include, at a cache side, allowing the memory controller to read data from a memory and to buffer the data to the buffer and, allowing the memory controller to write buffered data to a destination on the memory.

In accordance with another aspect of the present disclosure, a computing device for performing data copying is provided. The computing device includes a processor, a cache connected to the processor by a system bus, a memory controller connected to the cache by a local bus, and a memory connected to the memory controller, wherein the cache performs data copying on the memory by using the local bus based on a data copy command received from the processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Moreover, in the drawings, some components may be exaggerated, omitted, or schematically illustrated. Moreover, the size of each component does not entirely reflect an actual size and thus the present disclosure is not limited to the relative size or interval of components drawn on each drawing.

A bus disclosed herein corresponds to a path through which information flows between devices configuring a system. The information may include data, addresses indicating at which data is stored, and control signals that are used for a read/write operation on data, a read/write operation on input and output devices, or a request/approve operation on a bus.

A computing device may include various types of a bus. For example, various names are used in relation to the location of the bus or a device to which the bus is connected, include a system bus, a local bus, an Input/Output (I/O) bus, an external (or expansion) bus, a Central Processing Unit (CPU) bus, a memory bus, and the like. The system bus disclosed herein corresponds to a bus that allows a processor to access a memory, another processor, input and output devices, and/or the like. In contrast, the local bus corresponds to a bus that allows a device connected to a system bus to be connected to another device not connected to the system bus or that allows the internal connection between other devices that are not connected to the system bus. For example, it may be understood that a CPU for accessing a memory is connected to a memory controller through the system bus but the memory controller is connected to the memory through the local bus. When the CPU includes a certain cache, a cache controller, and/or a memory controller and accesses a memory and other input/output devices by using the certain cache, the cache controller, and/or the memory controller, a bus used by the CPU for internally communicating with the cache, the cache controller, and/or the memory controller becomes the local bus. However, a bus used by the CPU for accessing the memory and other input/output devices corresponds to the system bus. Such definitions are consistently used herein, and different configurations from the examples above in relation to the characteristics disclosed herein will be described in detail with respect to FIGS. 4 and 5.

The processor disclosed herein corresponds to a device that is connected to the system bus and that may perform operations for delivering specific commands or processing data. For example, a CPU 100, a Direct Memory Access (DMA) 110, an I/O controller 120, a Graphics Processor Unit (GPU), a Digital Signal Processor (DSP), a Micro Processor Unit (MPU), a hardware accelerator, and a general Memory Access Unit (MAU) may correspond to the processor.

Figure 2:
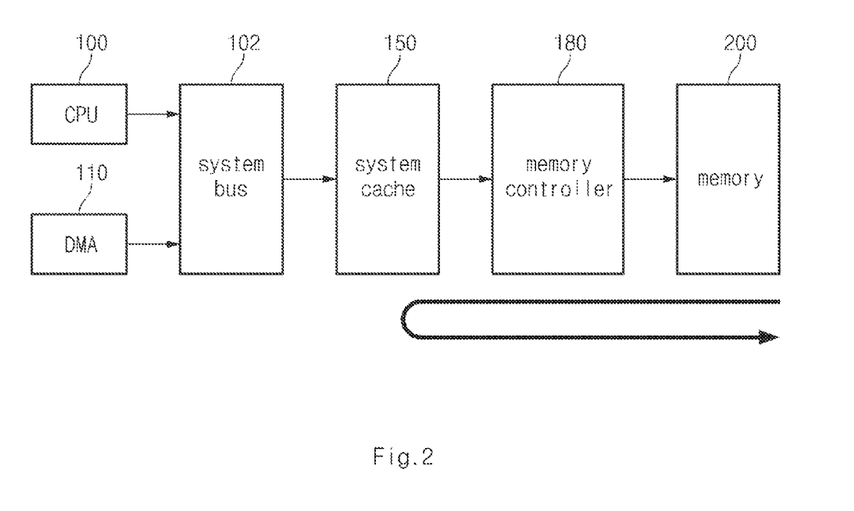
FIG. 2 is a conceptual view of a data flow in copying data using a cache according to an embodiment of the present disclosure.

FIG. 2 is a conceptual view of a data flow in copying data using a cache according to an embodiment of the present disclosure.

Referring to FIG. 2, a copy data command is delivered from the CPU 100 or the DMA controller 110 to a system cache 150 via a system bus 102. The CPU 100 and the DMA controller 110 as shown in FIG. 2 are processors and the present disclosure is not limited thereto.

The cache 150 receiving the copy data command provides the copy data command to a memory controller 180. More particularly, the cache 150 allows the memory controller 180 to read data to be copied from the memory 200, and then if the data is read, the cache 150 allows the memory controller 180 to write corresponding data to write a target region of the memory 200.

The memory as shown in FIG. 2 generally corresponds to a Random Access Memory (RAM). However, various embodiments of the present disclosure are not limited thereto. The process shown in FIG. 2 may also be applied to other types of memory, for example, a flash memory, a hard disk, an optical disk, and/or the like.

According to various embodiments of the present disclosure, similar to the data flow illustrated in FIG. 2, a data flow through the system bus 102 may be distinguished from a data flow through the local bus by using the cache 150. However, according to various embodiments of the present disclosure, an MAU may be connected to the memory controller 180 without being directly connected to the system bus 102. By locating the cache 150 between the memory controller 180 and the MAU, distinguishing a data flow through a first local bus (e.g., connecting MAU-cache) from a data flow through a second local bus (e.g., connecting cache-memory controller) may be possible.

Figure 3:
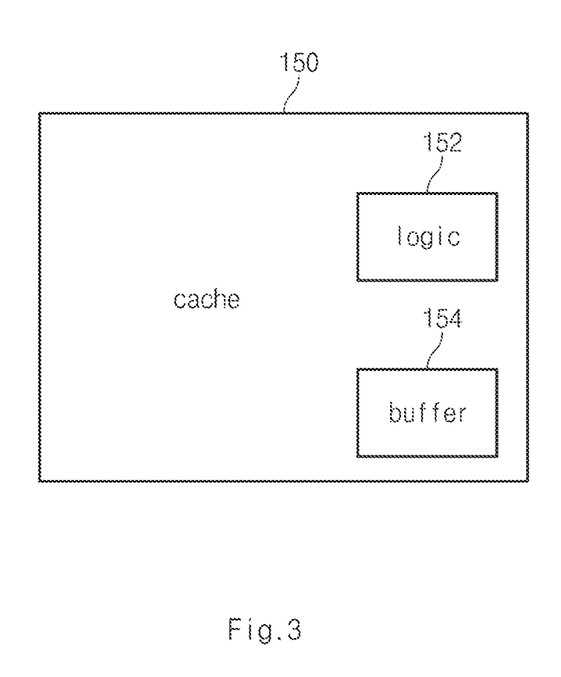
FIG. 3 is a conceptual view of an example of a cache according to an embodiment of the present disclosure.

FIG. 3 is a conceptual view of an example of a cache according to an embodiment of the present disclosure.

Referring to FIG. 3, the cache 150 includes logic 152 and a buffer 154. The logic 152 may be copy logic for performing a copy memory command. However, including logic for general control signals, such as logic for transmitting an interrupt that copying is completed, and/or the like may be possible.

According to various embodiments of the present disclosure, the buffer 154 is a member for temporarily storing data read by the memory controller 180. When the cache 150 is independent of the memory controller 180 or the processor 180, a constraint on the size of the buffer 154 relatively decreases. In general, the memory controller 180 performs an Out-of-Order Execution (OOE) on a command to enhance performance, and to this end, there is a need for a space to store access memory commands for the memory controller 180. In this case, if data is stored in the buffer 154 located outside the memory controller 180, regions at which the memory controller 180 performs the OOE relatively increase and thus enhancing the performance of the memory controller 180 is possible.

Thereafter, the cache 150 receives the copy data command from the processor. The copy data command may include information on source data to be copied, information on a destination to which the source data is copied, and a control signal for providing a copy command. Information on source data may include a start address that represents a memory block from which the source data starts on the memory 200. In addition, source data may include an end (last) address that represents the last memory block of the source data, or the length of the source data. The destination information may include the length and/or address of a memory block to which the source data is scheduled to be copied.

Specifically, through a register setup, the start and last addresses of a memory for data to be copied to the logic 152 of the cache 150, or the start address of a memory and a length to be copied are set up. Such a command is delivered to through the system bus 102. Thereafter, the logic 152 instructs the memory controller 180 to read data from the memory 200 based on the copy data command. The data read by the memory controller 180 is temporarily stored in the buffer 154. If data corresponding to the capacity of the buffer 154 is accumulated, the copy logic 152 allows the memory controller 182 to write the buffered data to a destination. Such processes are repeated to the last address of data to be copied, or by the defined length of data. If the last data is transmitted, the cache 150 ends data copying.

Figure 4:
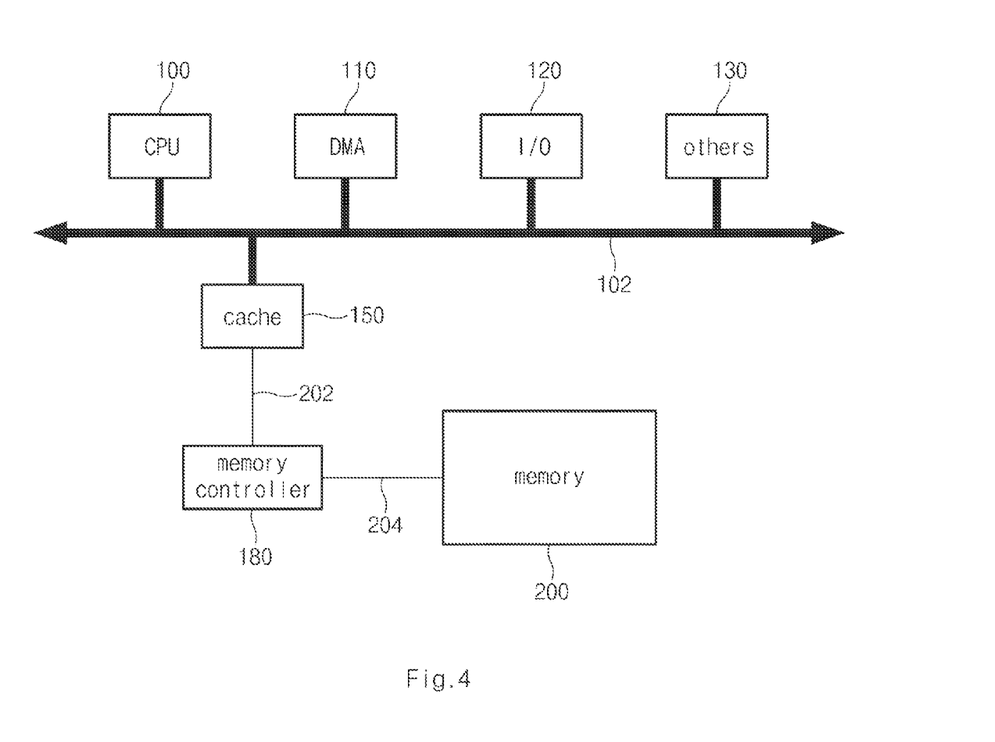
FIG. 4 is a conceptual view of a data copying system using a cache according to an embodiment of the present disclosure.

FIG. 4 is a conceptual view of a data copying system using a cache according to an embodiment of the present disclosure.

Referring to FIG. 4, the system may include a CPU 100, a DMA controller 110, an I/O controller 120, and other peripheral devices 130. Devices that may approach a memory 200 through a system bus 102 are collectively referred to as processors. Such processors are connected to a cache 150 through the system bus 102. The cache 150 is connected to the memory controller 180 through a local bus 202. The memory controller 180 is also connected to the memory 200 through another local bus 204.

Referring to FIG. 4, the cache 150 is a stand-alone device with respect to the processor and the memory controller 180. Because the cache 150 is a stand-alone device that is located outside the memory controller 180, the performance of the memory controller 180 is enhanced as described above. Moreover, because the cache 150 exists independently and may be connected to a typical system bus 102 and local buses 202 and 204, enhancing compatibility with a typical system without increasing the complexity of a typical processor or memory controller 180 is possible.

Both the system bus 102 and the local buses 202 and 204 generally include an address bus, a data bus, and a control bus. The address bus is a unidirectional bus that is used when the processor designates the address of an external memory or input and output devices. The data bus is a bidirectional bus that is used as a data transmission path when outputting data to the memory or an output device or when inputting data from the memory or an input device. The control bus is a unidirectional bus through which an output signal, which notifies the type or state of a task being currently performed by the processor of the memory or the input and output devices, and an input signal for requesting an external processor to take a certain action flow.

Referring back to FIG. 4, the processor transmits the copy data command to the cache 150 through the system bus 102. A control signal included in the copy data command is delivered through the control bus, and the address of source data to be copied is delivered through the address bus. Based on such information, the cache 150 controls the memory controller 180 and performs data copying on the memory 200. Because the cache 150 performs the copy data command, the data copied from when the copy data command is received from the processor to when data copying is completed flows through the local buses 202 and 204. If copying is completed, the cache 150 sends to the processor a copying completion signal through the system bus 102 (e.g., control bus).

Because typical data copying using the PIO and DMA techniques is performed without the stand-alone cache 150, copied data flows via the system bus 102. Because the flow of copied data through the system bus 102 occupies the bandwidth of the system bus and thus increases traffic, typical data copying using the PIO and DMA techniques results in a decrease in system performance. However, according to various embodiments of the present disclosure, decreasing the bandwidth occupancy of the system bus and thus promoting enhancement in system performance is possible by using the cache 150 that is located between the system bus and the local bus.

Figure 5:
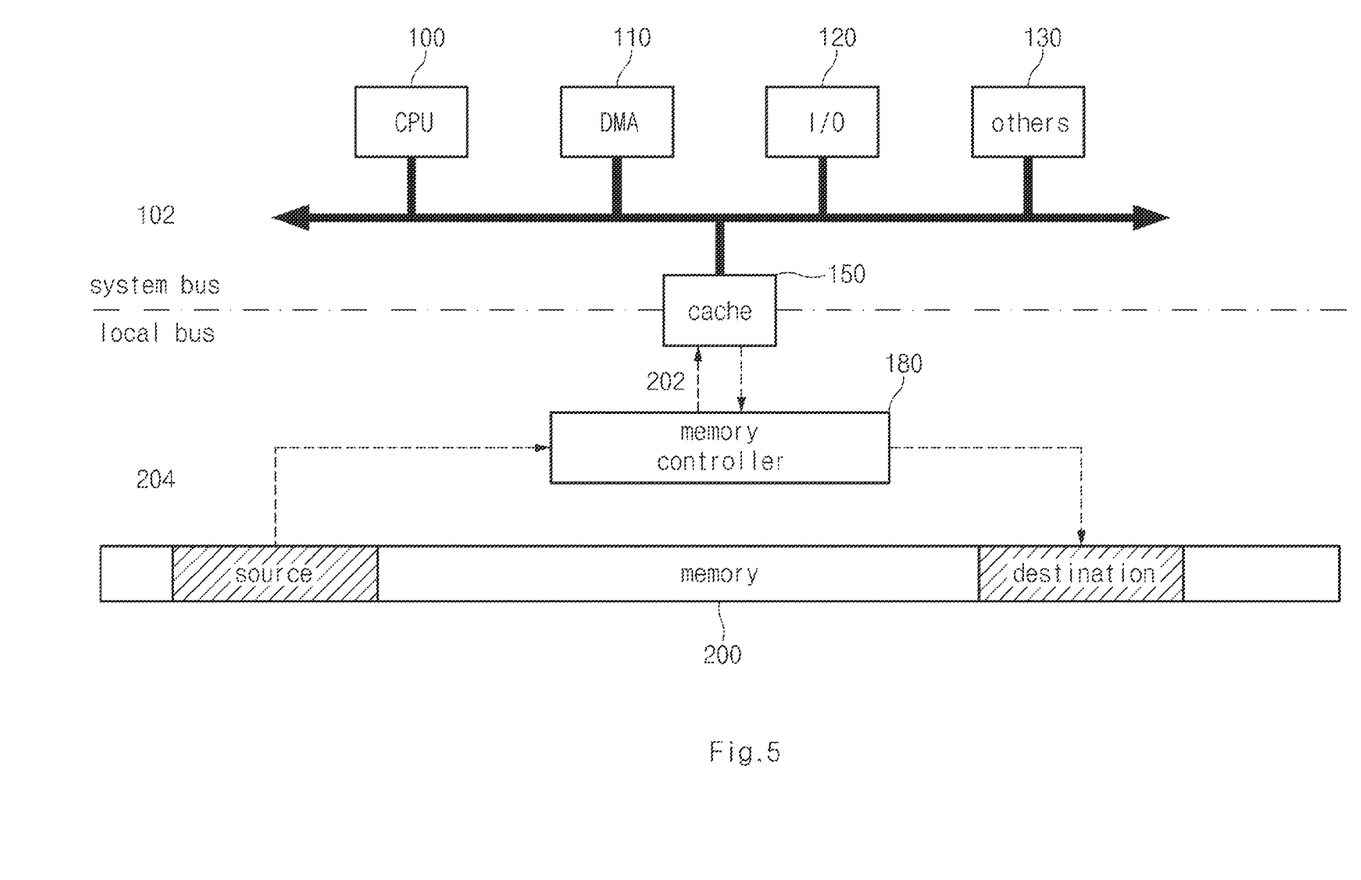
FIG. 5 is a conceptual view of a data bus in a data copying system using a cache according to an embodiment of the present disclosure.

FIG. 5 is a conceptual view of a data bus in a data copying system using a cache according to an embodiment of the present disclosure.

Referring to FIG. 5, details for which a description is already provided with respect to FIG. 4 are skipped. A region over the broken line around the cache 150 corresponds to a region sharing the system bus 102, and a region under the broken line corresponds to a region connected by the local buses 202 and 204.

If the cache 150 receives the copy data command from the processor, the cache 150 allows the memory controller 180 to read source data through the local bus 202. The memory controller 180 references address information on the source data included in the copy data command and reads data from a corresponding memory block of the memory 200. The data may be stored in the buffer 154 of the cache 150 through the data bus of the local buses 202 and 204. If data is buffered at maximum capacity in the buffer 154, the cache 150 or the copy logic 152 of the cache 150 may allow the memory controller 180 to write the buffered data to a memory block on the memory 200 to which copying is performed. The location (address) of the memory block may be included as destination information in the copy data command. If copying is completed, the cache 150 may send a copying completion notification through the system bus 102.

Figure 6:
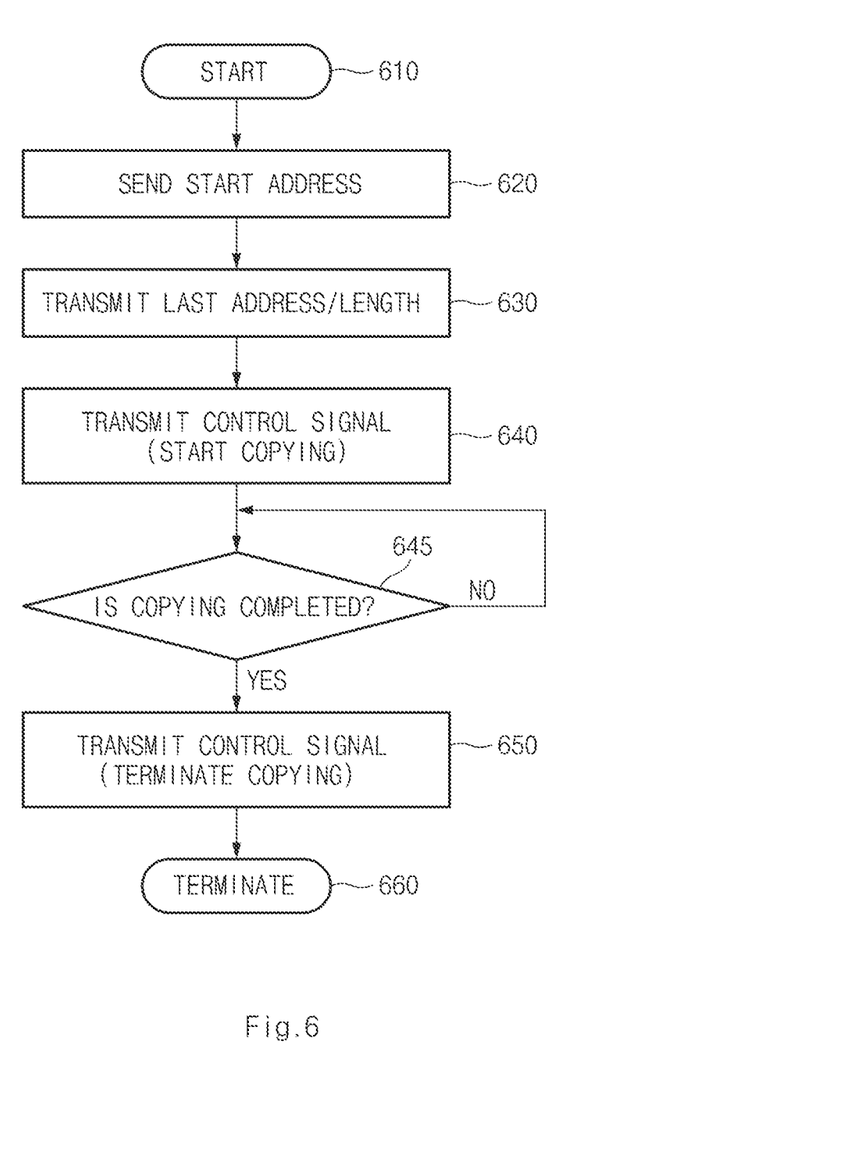
FIG. 6 is a flowchart of a process in which a processor performs data copying using a cache according to an embodiment of the present disclosure.

FIG. 6 is a flowchart of a process in which a processor performs data copying using a cache according to an embodiment of the present disclosure.

Referring to FIG. 6, at operation 610, the process in which a processor performs data copying using a cache starts.

At operation 620, the processor transmits the start address of data to be copied to the cache 150 through the system bus 102.

At operation 630, the processor transmits to the cache 150 the last address of data to be copied or the length of the data to be copied. The start and last addresses of data correspond to the start and last locations of a memory block in which data is stored on the memory 200. The length of data corresponds to the length of a memory block in which data to be copied is stored.

At operation 640, a control signal for starting data copying is transmitted to the cache 150.

At operation 645, the processor determines whether copying is completed. For example, the processor determines whether a notification indicating that copying is completion is received from the cache 150.

If the processor determines that copying is not completed (e.g., that the notification indicating that copying is completion is not received from the cache 150) at operation 645, then the processor may continue to poll for an indication that the copying is completed. Moreover, if the processor determines that copying is not completed at operation 645, then the processor may continue to perform copying using the cache 150.

If the processor determines that copying is completed (e.g., that the notification indicating that copying is completion is received from the cache 150) at operation 645, then the processor may proceed to operation 650 at which the processor may transmit to the cache 150 a control signal instructing to terminate copying in operation 650. However, according to various embodiments of the present disclosure, operation 650 is not essential, so the transmission of the control signal may be skipped depending on the type of the processor or a memory copying task.

At operation 660, the process terminates if copying and signal transmissions are all completed, the process terminates.

Figure 7:
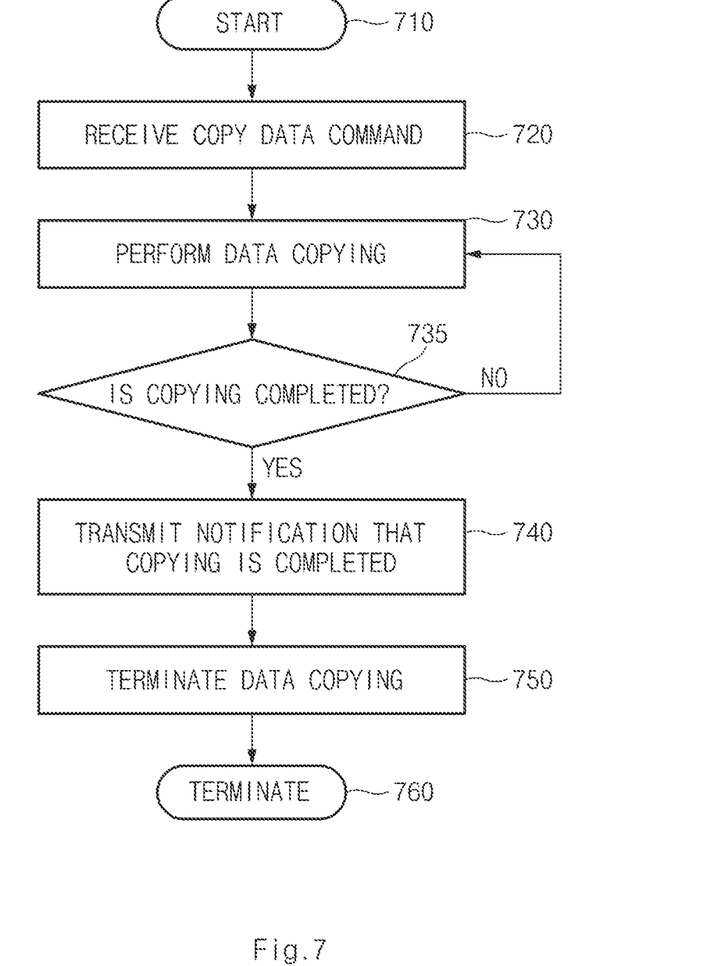
FIG. 7 is a flowchart of a process in which a cache performs data copying according to a copy data command according to an embodiment of the present disclosure.

FIG. 7 is a flowchart of a process in which a cache performs data copying according to a copy data command according to an embodiment of the present disclosure.

Referring to FIG. 7, at operation 710, the process in which a cache performs data copying according to a copy data command starts.

At operation 720, the cache 150 receives the copy data command from the processor through the system bus 102. According to various embodiments of the present disclosure, operation 720 may be divided into an operation of transmitting/receiving the start address of source data to be copied, an operation of transmitting/receiving the last address thereof, and an operation of transmitting/receiving a control signal for starting copying, as described above with reference to FIG. 6. Moreover, the copy data command may include information a destination to which source data is copied.

At operation 730, the cache 150 performs data copying through the local bus. In particular, the cache 150 may allow the memory controller 180 to read data from a memory block corresponding to source data information included in the copy data command and write the read data to a memory block corresponding to destination information.

At operation 735, the cache 150 determines whether data copying is completed.

If the cache 150 determines that copying is not completed at operation 735, then the cache 150 continues to copy data.

In contrast, if the cache 150 determines that copying is completed at operation 735, then the cache 150 proceeds to operation 740 at which the cache 150 notifies the processor of data copying completion through the system bus 102. According to various embodiments of the present disclosure, the notification of data copying completion may be a control signal such as interrupt.

At operation 750, if the cache 150 receives a final data copying termination signal from the processor, then the cache 150 terminates data copying.

As described above, if there is, for example, no continuous copying task using a queue, the cache 150 may transmit the copying completion notification to the processor and immediately terminate the process at operation 760.

Figure 8:
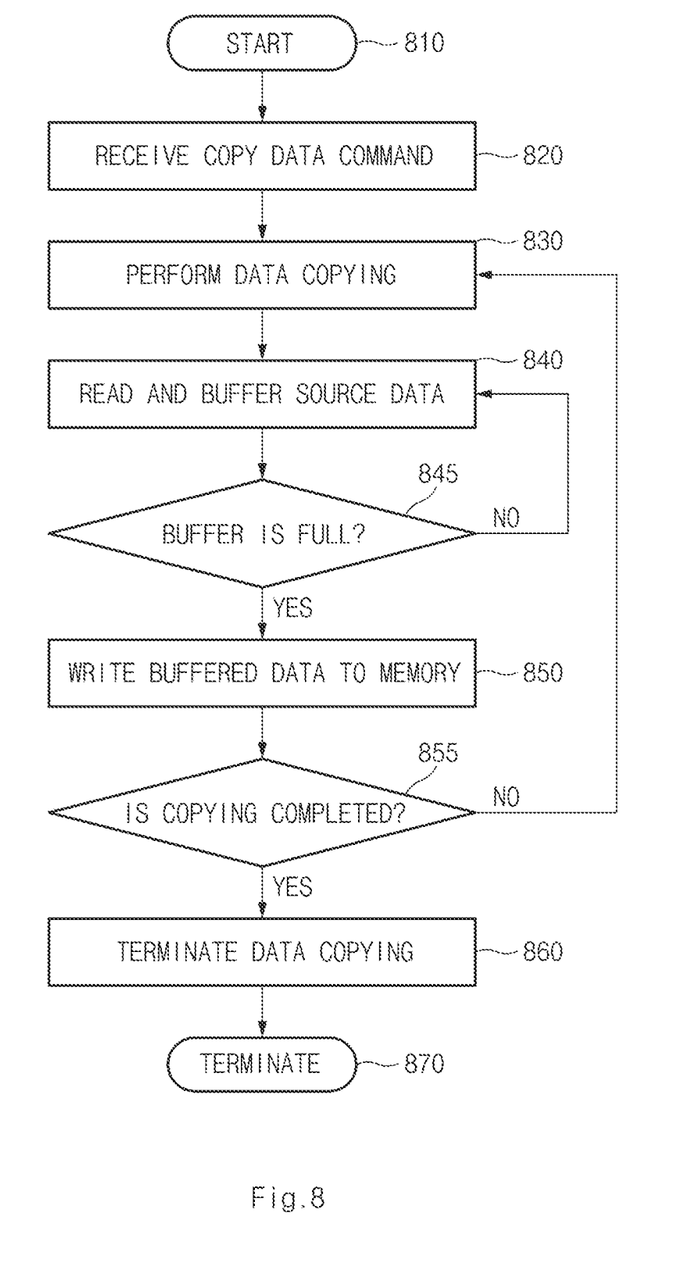
FIG. 8 is a flowchart of a process in which a cache performs data copying using a buffer according to an embodiment of the present disclosure.

FIG. 8 is a flowchart of a process in which a cache performs data copying using a buffer according to an embodiment of the present disclosure.

Referring to FIG. 8, at operation 810, the process in which a cache performs data copying using a buffer starts.

At operation 820, the cache 150 receives a copy data command.

At operation 830, the cache 150 performs data copying. According to various embodiments of the present disclosure, the data copying may further involve the following operations.

At operation 840, the cache 150 allows the memory controller 180 to read data and buffer the data in the buffer 154 of the cache 150. This task may be performed until data is buffered at maximum capacity in the buffer 154. For example, at operation 845, the cache 150 may determine whether the buffer 154 is full. If the cache 150 determines that the buffer 154 is not full at operation 845, then the cache 150 may return to operation 840 at which the cache 150 allows the memory controller 180 to read data and buffer the data in the buffer 154 of the cache 150. In contrast, if the cache 150 determines that the buffer 154 is full at operation 845, then the cache 150 may proceed to operation 850.

At operation 850, the cache 150 allows the memory controller 180 to write the buffered data to the memory 200 if the buffer 154 has data.

At operation 855, the cache 150 determines whether copying is completed.

If the cache 150 determines that copying is not completed at operation 855, then the cache 150 proceeds to operation 830 at which operations 830 to 855 are again performed.

In contrast, if the cache 150 determines that copying is completed at operation 855, then the cache 150 proceeds to operation 860 at which data copying is terminated. As described above, the cache 150 may send interrupt to the processor if data copying is completed.

At operation 870, process in which a cache performs data copying using a buffer is terminated.

According to various embodiments of the present disclosure, when performing data copying on the memory, data does not flow to the system bus due to the cache that is located between the processor and the memory controller. Thus, traffic occurring on the system bus when copying data decreases as compared to the typical PIO/DMA techniques. As a result, the cache enhance system perform by securing the bandwidth of the system bus.

Moreover, according to various embodiments of the present disclosure, if the cache located outside the memory controller performs data buffering, the cache increase the flexibility of an OOE for typical memory access commands of the memory controller and thus decreases the load of the memory controller. As a result, cache enhances the operation performance of the memory controller.

Moreover, according to various embodiments of the present disclosure, if the cache is independently located outside the processor, the memory, or the memory controller, the cache may be easily compatible with typical devices. Additionally, it is possible to have a relatively large buffer capacity as compared to when the cache is located in the processor or the memory controller, and the cache contributes to enhancement in the performance of the above-described memory controller.

The component represented as a means for performing a specific function covers any method of performing the specific function and such a component may include a combination of circuit components performing specific functions, or any form of software that is combined with suitable circuits to execute software for performing the specific functions and include firmware, micro-codes, and the like.

For example, it will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

In the specification, 'an embodiment' of the principles of the present disclosure and the various modified names of such an expression mean that specific characteristics, structures, and properties related to the embodiment are included in at least one embodiment of the principle of the present disclosure. Thus, the expression 'an 'embodiment' and any other modified examples disclosed throughout the specification do not necessarily indicate the same embodiment.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A cache for performing data copying, the cache comprising:
   a copy logic,
   wherein the cache is connected to a processor through a first bus and to a memory controller through a second bus, which is different from the first bus,
   wherein the copy logic is configured to control the memory controller to copy a source data stored on a first portion of a memory connected to the memory controller to a second portion of the memory using the second bus based on a data copy command received from the processor,
   wherein the first bus connects among the processor, the cache, and one or more components, and the cache and the memory controller are connected only by the second bus, and
   wherein both the first bus and the second bus include an address bus, a bidirectional data bus, and a control bus.

2. The cache according to claim 1, wherein the cache is a stand-alone device in relation to the processor and the memory controller.

3. The cache according to claim 1, wherein the first bus corresponds to a system bus and the second bus corresponds to a local bus.

4. The cache according to claim 1, wherein the data copy command includes a control signal, information on the source data to be copied, and information on a destination to which the source data is copied.

5. The cache according to claim 4, wherein the information on the source data to be copied includes start and last addresses of the source data on a memory, or a start address of the source data on the memory and a length of the source data.

6. The cache according to claim 1, wherein, when the performing of the data copying is completed, the cache is further configured to notify the processor of completion of the data copying through the first bus.

7. The cache according to claim 1, further comprising:
   a buffer,
   wherein the copy logic is further configured to:
      allow the memory controller to read data from a memory and to store the data to the buffer, and
      write data stored in the buffer to a predetermined memory block on the memory.

8. A method of performing data copying, the method comprising:
   receiving, at a cache, a data copy command from a processor through a first bus; and
   performing, at the cache, data copying a source data stored on a first portion of a memory connected to a memory controller to a second portion of the memory using a second bus which is different from the first bus,
   wherein the first bus connects among the processor, the cache, and one or more components, and the cache and a memory controller are connected only by the second bus, and
   wherein both the first bus and the second bus include an address bus, a bidirectional data bus, and a control bus.

9. The method according to claim 8, wherein the cache is a stand-alone device in relation to a device connected to the cache by the first bus or the second bus.

10. The method according to claim 8, wherein the first bus corresponds to a system bus and the second bus corresponds to a local bus.

11. The method according to claim 8, wherein the first bus is a first local bus and the second bus is a second local bus.

12. The method according to claim 8, wherein the data copy command includes a control signal, information on the source data to be copied, and information on a destination to which the source data is copied.

13. The method according to claim 12, wherein the information on the source data to be copied includes start and last addresses of the source data on a memory, or a start address of the source data on the memory and a length of the source data.

14. The method according to claim 8,
   wherein the performing, at the cache, of the data copying includes, at a cache side, allowing the memory controller to write data corresponding to information on the source data to a memory block corresponding to the information on a destination.

15. The method according to claim 8,
   wherein the cache further includes a buffer, and
   wherein the performing, at the cache, of the data copying includes, at a cache side, allowing the memory controller to read data from a memory and to buffer the data and allowing the memory controller to write buffered data to a destination on the memory.

16. A non-transitory computer-readable storage medium storing instructions, that, when executed, cause at least one processor to perform the method of claim 8.

17. A computing device for performing data copying, the computing device comprising:
   a processor;
   a cache connected to the processor by a system bus;
   a memory controller connected to the cache by a local bus; and
   a memory connected to the memory controller,
   wherein the cache is configured to control the memory controller to copy a source data stored on a first portion of the memory connected to the memory controller to a second portion of the memory using the local bus based on a data copy command received from the processor,
   wherein the system bus connects among the processor, the cache, and one or more components, and the cache and the memory controller are connected only by the local bus, and
   wherein both the local bus and the system bus include an address bus, a bidirectional data bus, and a control bus.

18. The computing device of claim 17, wherein the data copy command includes a control signal, information on the source data to be copied, and information on a destination to which the source data is copied.

19. The computing device of claim 18, wherein the information on the source data to be copied includes start and last addresses of the source data on the memory, or a start address of the source data on the memory and a length of the source data.

20. The computing device of claim 17,
   wherein the cache includes a buffer, and
   wherein the cache is configured to:
      allow the memory controller to read data from the memory and to store the data to the buffer, and
      write data stored in the buffer to a predetermined memory block on the memory.

* * * * *